(12) United States Patent
Maehara (10) Patent No.: US 11,273,674 B2
(45) Date of Patent: Mar. 15, 2022

(54) PNEUMATIC TIRE (71) Applicant: BRIDGESTONE CORPORATION, Tokyo (JP)

(72) Inventor: Daisuke Maehara, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 181 days.

(21) Appl. No.: 16/326,079

(22) PCT Filed: Jun. 22, 2017

(86) PCT No.: PCT/JP2017/023063
§ 371 (c)(1),
(2) Date: Feb. 15, 2019

(87) PCT Pub. No.: WO2018/034060
PCT Pub. Date: Feb. 22, 2018

(65) Prior Publication Data
US 2019/0184751 A1 Jun. 20, 2019

(30) Foreign Application Priority Data
Aug. 17, 2016 (JP) .............................. JP2016-160162

(51) Int. Cl.
B60C 9/22 (2006.01)
B60C 9/00 (2006.01)
(Continued)

(52) U.S. Cl.
CPC .............. B60C 9/2204 (2013.01); B60C 9/00 (2013.01); B60C 9/2006 (2013.01); B60C 9/22 (2013.01);
(Continued)

(58) Field of Classification Search
None
See application file for complete search history.

(56) References Cited

U.S. PATENT DOCUMENTS

2009/0120551 A1* 5/2009 Yamamoto ............ B60C 13/002
152/533
2013/0048185 A1* 2/2013 Harikae ................ B60C 9/2204
152/527
(Continued)

FOREIGN PATENT DOCUMENTS

CN 102950973 A 3/2013
CN 104334370 A 2/2015
(Continued)

OTHER PUBLICATIONS

Communication dated May 24, 2019 from European Patent Office in counterpart EP Application No. 17841288.8.
(Continued)

Primary Examiner — Timothy Kennedy
Assistant Examiner — Olukorede Esan
(74) Attorney, Agent, or Firm — Sughrue Mion, PLLC (57) ABSTRACT In my pneumatic tire, a circumferential belt is formed by a spirally wound band strip, the tread includes at least three circumferential land portions, cords of the inclined belt layer are steel cords, the total cross-sectional area of the steel cords per 25 mm of width perpendicular to the extending direction of the steel cords is from 2.3 to 4.0 mm$^2$, a gap is present in the tire width direction between each lap of the band strip, and the relational expression $W/\{(w+2d)+0.3\times w\} \geq 1.0$ is satisfied, where W is the width in the tire width direction of the circumferential land portion with the smallest width among the circumferential land portions, w is the width of the band strip in the tire width direction, and d is the width of the gap in the tire width direction between each lap of the band strip.

1 Claim, 10 Drawing Sheets (51) Int. Cl.
　　 *B60C 9/20*　　　(2006.01)
　　 *B60C 15/00*　　 (2006.01)
　　 *B60C 15/06*　　 (2006.01)

(52) U.S. Cl.
　　 CPC .......... *B60C 15/0018* (2013.01); *B60C 15/06* (2013.01); *B60C 2009/2012* (2013.01); *B60C 2009/2077* (2013.01); *B60C 2009/2083* (2013.01); *B60C 2009/2219* (2013.01); *B60C 2009/2223* (2013.01); *B60C 2009/2247* (2013.01)

(56) References Cited

U.S. PATENT DOCUMENTS

| | | | |
|---|---|---|---|
| 2013/0263994 | A1 | 10/2013 | Nakamura |
| 2014/0116587 | A1 | 5/2014 | Ueda et al. |
| 2014/0332130 | A1* | 11/2014 | Maehara ................ B60C 11/04 152/209.1 |
| 2015/0107745 | A1* | 4/2015 | Harikae ................... B60C 9/28 152/535 |
| 2015/0336345 | A1 | 11/2015 | Maehara |
| 2017/0274710 | A1 | 9/2017 | Matsumoto et al. |

FOREIGN PATENT DOCUMENTS

| | | |
|---|---|---|
| EP | 2 657 046 A1 | 10/2013 |
| EP | 2 801 486 A1 | 11/2014 |
| JP | 7-96710 A | 4/1995 |
| JP | 2007-8250 A | 1/2007 |
| JP | 2007-069408 A | 3/2007 |
| JP | 2013-043548 A | 3/2013 |
| JP | 2013-216120 A | 10/2013 |
| JP | 2013-226869 A | 11/2013 |
| JP | 2015-89703 A | 5/2015 |
| JP | 2016-52840 A | 4/2016 |
| JP | 2016-068671 A | 5/2016 |
| WO | 2012/086594 A1 | 6/2012 |
| WO | 2014/181705 A1 | 11/2014 |

OTHER PUBLICATIONS

Communication dated Apr. 27, 2020 from the China National Intellectual Property Administration in Application No. 201780050579.4.

International Search Report of PCT/JP2017/023063 dated Aug. 15, 2017.

* cited by examiner

PNEUMATIC TIRE

CROSS REFERENCE TO RELATED APPLICATIONS

This application is a National Stage of International Application No. PCT/JP2017/023063 filed Jun. 22, 2017, claiming priority based on Japanese Patent Application No. 2016-160162 filed Aug. 17, 2016.

TECHNICAL FIELD

The present disclosure relates to a pneumatic tire.

BACKGROUND

In a technique used in a known pneumatic tire, a strip with organic fiber cords bundled in a band is wound spirally around the tire radial outside of an inclined belt formed by two or more inclined belt layers whose steel cords cross each other between layers. This suppresses radial growth due to the centrifugal force during high-speed rotation and increases high-speed durability or the like.

In this context, a technique has been proposed to appropriately relieve an increase in rigidity due to the cords of the band strip by winding the band strip while providing a gap in the tire width direction between each lap of the band strip. For example, see patent literature (PTL) 1. This method can lower the vertical spring constant to an appropriate level and improve ride comfort and the like.

CITATION LIST

Patent Literature

PTL 1: JP2013226869A

SUMMARY

Technical Problem

The steering stability and braking performance may deteriorate with the aforementioned method, however, in particular when the amount of steel of the steel cords in the inclined belt layers is decreased to further reduce the vertical spring constant. The steering stability and braking performance thus have room for improvement.

In light of these considerations, the present disclosure aims to provide a pneumatic tire that can improve the steering stability and braking performance while reducing the vertical spring constant.

Solution to Problem

A summary of the present disclosure is as follows.

A pneumatic tire according to the present disclosure includes:

a carcass formed by one or more carcass plies extending toroidally between a pair of bead portions;

an inclined belt arranged on a tire radial outside of the carcass and formed by one or more inclined belt layers made of cords extending at an inclination relative to a tire circumferential direction;

a circumferential belt arranged on the tire radial outside of the inclined belt and formed by one or more circumferential belt layers made of cords extending in the tire circumferential direction; and a tread portion on the tire radial outside of the circumferential belt; wherein the circumferential belt is made of a spirally wound band strip;

the tire further comprises, on the tread portion, a plurality of circumferential main grooves extending in the tire circumferential direction and three or more circumferential land portions defined by two of the circumferential main grooves or by one of the circumferential main grooves and a tread edge;

the cords of the inclined belt layer are steel cords, and a total cross-sectional area of the steel cords per 25 mm of width perpendicular to an extending direction of the steel cords is in a range of 2.3 $mm^2$ to 4.0 $mm^2$; and in a reference state in which the tire is mounted on an applicable rim, is filled to a prescribed internal pressure, and has no load applied thereon, a gap is present in a tire width direction between each lap of the band strip; and a relational expression $W/\{(w+2d)+0.3 \times w\} \geq 1.0$ is satisfied, where W is a width in the tire width direction of a circumferential land portion, among the three or more circumferential land portions, that has a smallest width in the tire width direction, w is a width of the band strip in the tire width direction, and d is a width of the gap in the tire width direction between each lap of the band strip.

In the present disclosure, the "applicable rim" refers to a standard rim, of an applicable size, described in industrial standards effective in the region where the tire is manufactured and used, such as the JATMA YEAR BOOK published by the Japan Automobile Tyre Manufacturers Association (JATMA) in Japan, the STANDARDS Definitions of the European Tire and Rim Technical Organisation (ETRTO) in Europe, and the YEAR BOOK of the Tire and Rim Association, Inc. (TRA) in the USA. The standard rim corresponds to the Measuring Rim in the STANDARDS Definitions of the ETRTO and the Design Rim in the YEAR BOOK of the TRA. The "prescribed internal pressure" represents the air pressure corresponding to the maximum load capability for the applicable size and ply rating prescribed by the aforementioned JATMA YEAR BOOK and the like. The "maximum load capability" represents the maximum mass, under the aforementioned standards, permitted to be loaded on the tire.

The "total cross-sectional area of the steel cords per 25 mm of width perpendicular to the extending direction of the steel cords" can be calculated as follows. A sample is cut to yield a cross-section orthogonal to the extending direction of the steel cords, and a belt filament is extracted from the cut sample near the circumferential land portion with the smallest width in the tire width direction. The filament diameter is measured, and the cross-sectional area of the filament is calculated from the diameter. The calculated cross-sectional area of one filament is then multiplied by the number of filaments constituting the cord (for example, 2 to 6), and the result is further multiplied by the number of steel cords (the number of embedded steel cords) per 25 mm of width perpendicular to the extending direction of the steel cords to calculate the total cross-sectional area. Alternatively, if the angle of the belt relative to the tire circumferential direction at the measured portion is examined in advance, then the number of cords per (25/cos θ) mm of the inclined belt near the circumferential land portion with the smallest width in the tire width direction can be examined on the surface of the cut sample, which is cut along the tire radial direction, without the need to cut the belt out from the tire. The result can be considered the same as above.

Stating that the cords "extend in the tire circumferential direction" includes not only the case of the cords extending in parallel to the tire circumferential direction, but also the case of the cords extending at an inclination angle of 10° or less relative to the tire circumferential direction.

The "circumferential main groove" refers to a groove with an opening width of 4 mm or more in the aforementioned reference state. Stating that the circumferential main groove "extends in the tire circumferential direction" includes not only the case of the circumferential main groove extending in parallel to the tire circumferential direction, but also the case of the circumferential main groove extending at an inclination angle of 150 or less relative to the tire circumferential direction. The circumferential main groove may extend in a straight line, extend in zigzag fashion, or extend while curving.

Here, the "tread edges" refer to the outermost positions in the tread width direction of the contact patch when the tire is mounted onto an applicable rim, filled to a prescribed internal pressure, and has a load corresponding to the maximum load capability (maximum load) applied thereon.

The "width in the tire width direction of the circumferential land portion" refers to the width in the tire width direction between the tire width direction outer edges of the surface of the circumferential land portion as viewed in a tire width direction cross-section orthogonal to the tire equator in the aforementioned reference state. When the width changes in the tire circumferential direction, the maximum width within one revolution in the tire circumferential direction is used.

The "width w of the band strip in the tire width direction" refers to the width of the band strip as viewed in a tire width direction cross-section in the aforementioned reference state.

Advantageous Effect

The present disclosure can provide a pneumatic tire that can improve the steering stability and braking performance while reducing the vertical spring constant.

DETAILED DESCRIPTION

Embodiments of the present disclosure are described below in detail with reference to the drawings.

Figure 1:
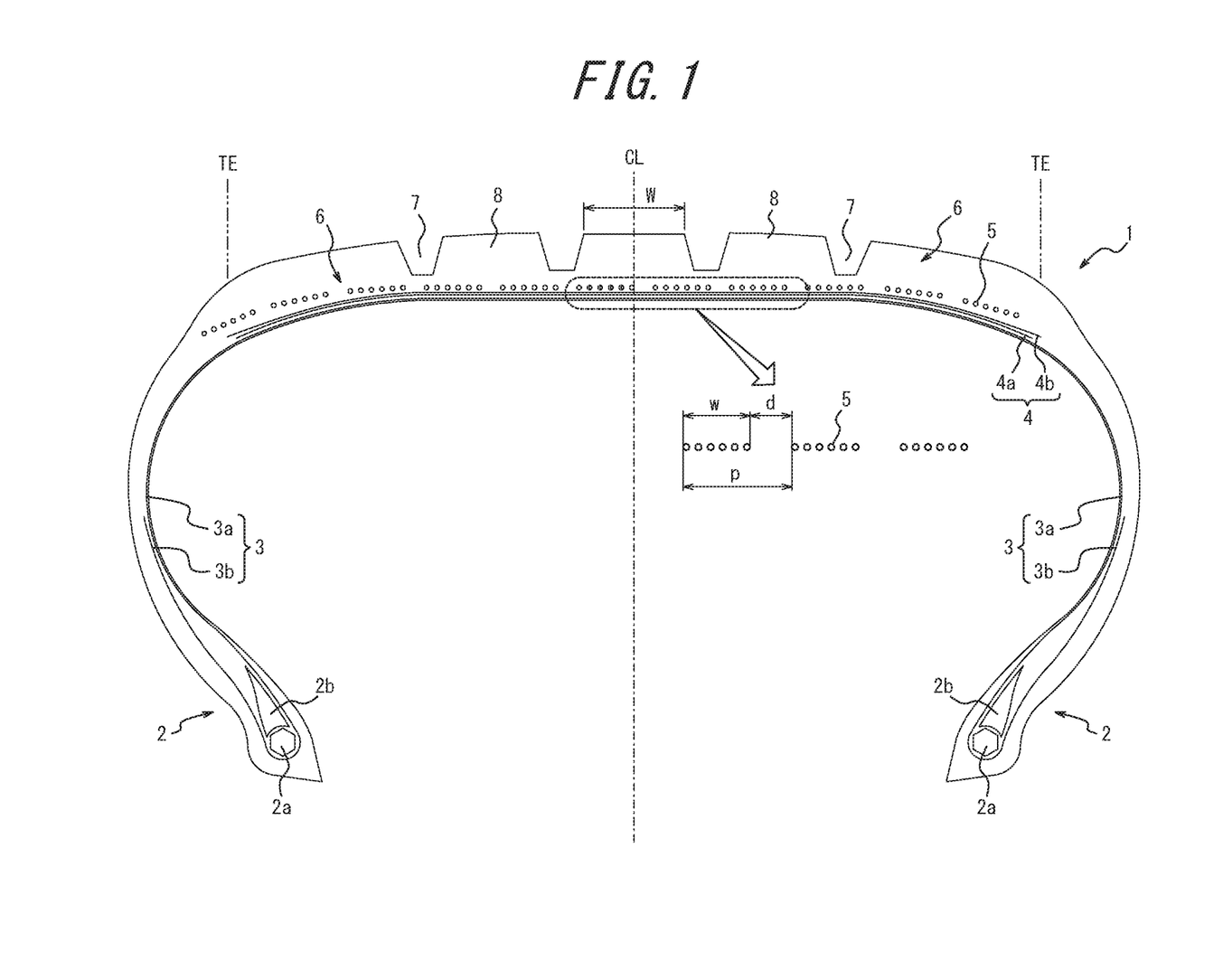
FIG. 1 is a cross-section in the tire width direction of a pneumatic tire according to an embodiment of the present disclosure.

FIG. 1 is a cross-sectional diagram in the tire width direction of a pneumatic tire (also simply a "tire") according to an embodiment of the present disclosure. FIG. 1 is a cross-section in the tire width direction of a tire in a reference state of being mounted onto an applicable rim, being filled to a prescribed internal pressure, and having no load applied thereon. As illustrated in FIG. 1, a tire 1 of the present embodiment includes a carcass 3, an inclined belt 4, a circumferential belt 5, and a tread portion 6. The carcass 3 is made of one or more carcass plies (one in the illustrated example) extending toroidally between a pair of bead portions 2. The inclined belt 4 is made of one or more (two in the illustrated example) inclined belt layers arranged on the tire radial outside of the carcass 3 and made of cords extending at an inclination relative to the tire circumferential direction. The circumferential belt 5 is made of one or more (one in the illustrated example) circumferential belt layers arranged on the tire radial outside of the inclined belt 4 and made of cords extending in the tire circumferential direction. The tread portion 6 is arranged on the tire radial outside of the circumferential belt 5.

As illustrated in FIG. 1, a pair of bead cores 2a are embedded in the pair of bead portions 2 in the present embodiment. In the illustrated example, the bead cores 2a have a hexagonal cross-sectional shape but can have any of a variety of cross-sectional shapes, such as a different polygonal cross-sectional shape or a circular cross-sectional shape. In the present embodiment, a bead filler 2b with a triangular cross-sectional shape is provided on the tire radial outside of the bead core 2a. The bead filler is not limited in shape to this example and may have any of a variety of cross-sectional shapes, such as a rectangular cross-sectional shape. The present disclosure encompasses a structure in which the bead filler 2b is not provided. To reinforce the bead portion, a reinforcement member such as a rubber layer or a cord layer may be provided around the bead core 2a. This reinforcement member can be provided at various positions relative to the position of the carcass 3 or the position of the bead filler 2b.

As illustrated in FIG. 1, the carcass 3 in the present embodiment includes a carcass body 3a locked by the pair of bead cores 2a and carcass turn-up portions 3b that extend from the carcass body 3a and are turned up around the bead cores 2a from the inside to the outside in the tire width direction. The present disclosure, however, is not limited to this example. At least a portion of the carcass 3 may be wound around the bead cores 2a, or the bead cores 2a may be divided into a plurality of bead core members, and a plurality of bead core members may clamp the carcass 3.

In the present disclosure, the carcass line may have a variety of shapes. For example, the position along the tire radial direction where the width of the carcass 3 in the tire width direction is maximized (carcass maximum width position) may be closer to the bead portions 2 or closer to the tread portion 6. Specifically, the carcass maximum width position may be at a position in a range of 50% to 90% of the tire section height SH outward in the tire radial direction from a bead base portion in the aforementioned reference state, for example.

In the present disclosure, the carcass 3 is preferably a radial carcass but may also be a bias carcass. Any material may be used in the carcass of the present disclosure, such as rayon, nylon, polyethylene naphthalate (PEN), polyethylene terephthalate (PET), aramid, glass fiber, carbon fiber, steel, or the like. Organic fiber cords are particularly preferably used to make the carcass member lightweight. Any number of cords may be embedded in the carcass 3, such as 20 to 60 cords per 50 mm.

In the present disclosure, the position of the turn-up edge of the carcass turn-up portion 3b can be further inward in the tire radial direction than the tire radial outer edge of the bead filler 2b. Conversely, the position of the turn-up edge of the carcass turn-up portion 3b in the present disclosure can be further outward in the tire radial direction than the tire radial outer edge of the bead filler 2b or the tire maximum width position. In this case, the turn-up edge can be positioned further inward in the tire width direction than the tire width direction outer edge of the inclined belt 4. Alternatively, as illustrated in FIG. 1, the position of the turn-up edge of the carcass turn-up portion 3b of the carcass 3 can be both further outward in the tire radial direction than the tire radial outer edge of the bead filler 2b and further inward in the tire radial direction than the tire maximum width position. Furthermore, when the carcass 3 is formed of a plurality of carcass plies, the turn-up ends of the carcass plies may be arranged at different positions in the tire radial direction.

In the present embodiment, the tire maximum width position is at a position in a range of 50% to 90% of the tire section height SH outward in the tire radial direction from the bead base portion in the aforementioned reference state. In the present disclosure, a rim guard may be included on the tire side portion.

The present disclosure can be applied to a side-reinforced run flat tire. In this case, turbulence-generating projections can be provided on the tire side portion. The turbulence generated by the turbulence-generating projections can cool the tire side portion. The turbulence-generating projections can be provided at the tire side portion on only the tire outer surface or also on the tire inner surface. When the mounting direction of the tire is designated, the turbulence-generating projections can also be provided at only one of the pair of tire side portions divided by the tire equatorial plane CL. In the case of a side-reinforced run flat tire, the run flat running performance can be improved by increasing the surface area over which dimples are provided on the tire side portion to increase heat dissipation.

In the present disclosure, the cords of the inclined belt layers in the embodiment illustrated in FIG. 1 are steel cords. The total cross-sectional area of the steel cords per 25 mm of width perpendicular to the extending direction of the steel cords is in a range of 2.3 mm$^2$ to 4.0 mm$^2$. The reinforcing effect achieved by the inclined belt layers is insufficient when the total cross-sectional area is less than 2.3 mm$^2$, whereas a total cross-sectional area exceeding 4.0 mm$^2$ leads to increased weight due to the steel cords.

In the present disclosure, the width of the inclined belt 4 in the tire width direction (when a plurality of inclined belt layers is provided, the width of the widest inclined belt layer in the tire width direction) is preferably in a range of 90% to 110% of the tread width TW, particularly preferably 100% to 105%. The "tread width TW" refers to the width in the tire width direction between the tread edges TE in the aforementioned reference state.

Monofilament cords or cords composed of multiple filaments twisted together may be used as the steel cords of the inclined belt layers. Various twist structures may be adopted and may differ in cross-sectional structure, twist pitch, twist direction, or distance between adjacent filaments, for example.

The circumferential belt 5 in the present disclosure is formed by a spirally wound band strip. The circumferential belt 5 has a gap in the tire width direction between each lap of the band strip. As illustrated in FIG. 1, the width of the gap in the tire width direction is d, and the band strip is arranged at a pitch p (mm) in the tire width direction between laps. The width of the band strip in the tire width direction is w.

A variety of materials can be used for the cords of the circumferential belt layer in the present disclosure, such as rayon, nylon, polyethylene naphthalate (PEN), polyethylene terephthalate (PET), aramid, glass fiber, carbon fiber, steel, or the like. Organic fiber cords are preferably used to reduce the weight.

Monofilament cords, cords composed of multiple filaments twisted together, or hybrid cords composed of filaments of different materials twisted together may be used as the cords of the circumferential belt layer in the present disclosure.

The width of the circumferential belt 5 in the tire width direction (when a plurality of circumferential belt layers is provided, the width of the widest circumferential belt layer in the tire width direction) can be designed in the present disclosure to be wider or narrower than the inclined belt layers. For example, the width of the circumferential belt 5 in the tire width direction may be set from 90% to 110% of the width of the inclined belt 4 in the tire width direction.

As illustrated in FIG. 1, the tire 1 of the present embodiment includes, on the tread portion 6, four circumferential main grooves 7 and three or more (five in the illustrated example) circumferential land portions 8 defined by two of the circumferential main grooves 7 or by one of the circumferential main grooves 7 and a tread edge TE. In this example, the circumferential land portions 8 are rib-like land portions. The circumferential land portions 8 of the present disclosure, however, may be defined in the tire circumferential direction by grooves or the like that extend in the tire width direction.

The tread rubber of the tread portion 6 in the present disclosure may be formed by a plurality of different rubber layers in the tire radial direction. The plurality of rubber layers may differ in properties such as the tangent loss, modulus, hardness, glass transition temperature, and material. Also, the thickness of the rubber layers in the tire radial direction may vary in the tire width direction. A portion of the tread rubber, such as the bottom of the circumferential main groove 7, may also be a different rubber layer from the surrounding tread rubber. Furthermore, the tread rubber may be formed by a plurality of different rubber layers in the tire width direction. The plurality of rubber layers may differ in properties such as the tangent loss, modulus, hardness, glass transition temperature, and material. The ratio of the width of the rubber layers in the tire width direction may vary in the tire radial direction. A partial region, such as near the circumferential main groove 7, near the tread edges TE, the shoulder land portions, or the center land portion, may also be a different rubber layer from the surrounding tread rubber.

Figure 2:
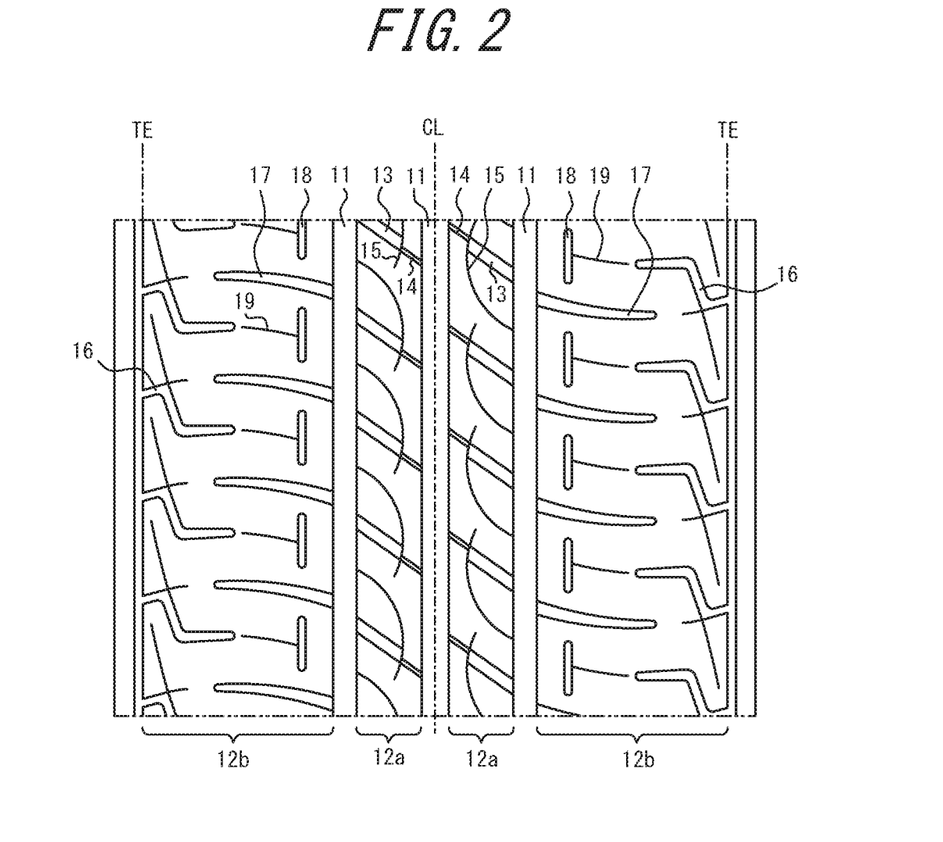
FIG. 2 is a development view illustrating a tread pattern of a pneumatic tire according to another embodiment.

FIG. 2 is a development view illustrating a tread pattern of a pneumatic tire according to another embodiment. The tread pattern illustrated in FIG. 2 includes three circumferential main grooves 11: a circumferential main groove 11 extending in the tire circumferential direction along the tire equatorial plane CL, and one circumferential main groove 11 to each side in the tire width direction. This tire includes a circumferential land portion 12a defined by two circumferential main grooves 11 in each of the tire widthwise half portions divided by the tire equatorial plane CL. A plurality of lateral grooves that connect two circumferential main grooves 11 and are inclined relative to the tire width direction are provided in the circumferential land portion 12a at intervals in the tire circumferential direction. The lateral grooves are formed by grooves 13 and grooves 14 with a smaller opening width than the grooves 13. The grooves 13 extend inward in the tire width direction from the circumferential main grooves 11 positioned on the sides in the tire width direction of the circumferential main groove 11 extending along the tire equatorial plane CL. The grooves 14 connect to the tire widthwise inner edge of the grooves 13 and extend inward in the tire width direction until connecting to the circumferential main groove 11 extending along the tire equatorial plane CL. A plurality of curved sipes 15 are provided in the land portion 12a at intervals in the tire circumferential direction. In the illustrated example, the sipes 15 extend inward in the tire width direction from the circumferential main grooves 11 positioned on the sides in the tire width direction of the circumferential main groove 11 extending along the tire equatorial plane CL, extend to form the boundary line between a groove 13 and a groove 14, and terminate inside the circumferential land portion 12a. The sipes 15 curve so that the center of curvature in a view of the tread surface is positioned on the tire width direction outside of the sipes 15. Next, in the circumferential land portions 12b defined by a circumferential main groove 11 and a tread edge TE, a plurality of grooves 16 having two bending points and extending inward in the tire width direction from the tread edge TE are provided at intervals in the tire circumferential direction. A plurality of grooves 17 extending outward in the tire width direction from the circumferential main grooves 11 are also provided in the circumferential land portions 12b at intervals in the tire circumferential direction. Grooves 18 extending in the tire circumferential direction are provided between the grooves 17 in the tire circumferential direction. This tire also includes sipes 19 extending outward in the tread width direction from the grooves 18. The sipes 19 terminate within the circumferential land portions without connecting to the grooves 16. As illustrated in FIG. 2, a point-symmetric pattern repeats in the tire circumferential direction in this tread pattern. The circumferential pitch of this repeated pattern may be constant or may be varied to reduce pattern noise.

Figure 3:
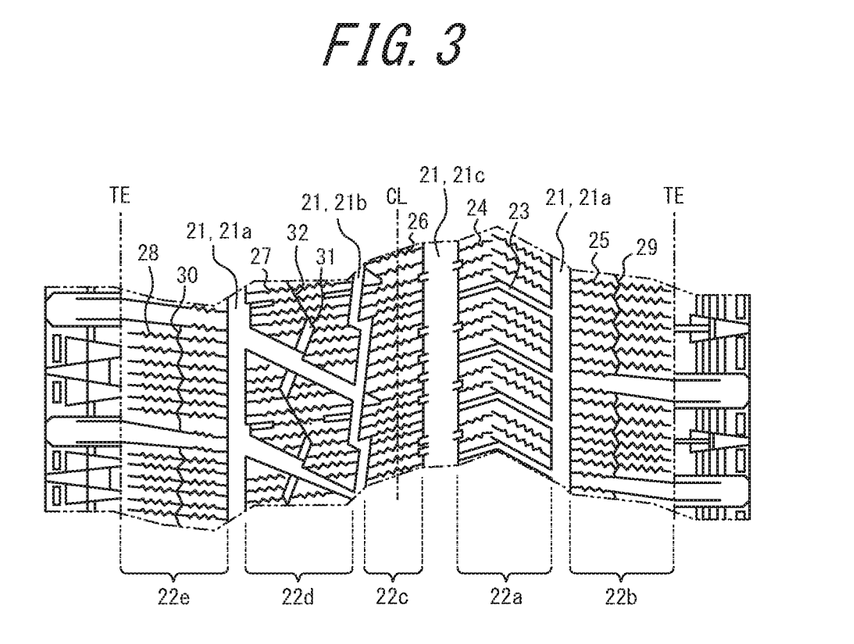
FIG. 3 is a development view illustrating a tread pattern of a pneumatic tire according to yet another embodiment.

FIG. 3 is a development view illustrating a tread pattern of a pneumatic tire according to yet another embodiment. The tread pattern in FIG. 3 is suitable for a winter tire. As illustrated in FIG. 3, this tread pattern includes two circumferential main grooves 21 on each side, in the tire width direction, of the tire equatorial plane CL (for a total of four circumferential main grooves 21 in the tread portion 6). The circumferential main grooves 21a adjacent to the tread edges TE in this example extend linearly. In this example, the circumferential main groove 21b adjacent to the tire equatorial plane CL in one half portion in the tire width direction is zigzag-shaped, whereas the circumferential main groove 21c adjacent to the tire equatorial plane CL in the other half portion in the tire width direction is linear and has the greatest groove width. In the other half portion in the tire width direction, grooves 23 that connect the two circumferential main grooves 21a, 21c and extend in the tire width direction are provided in the circumferential land portion 22a, which is defined by the two circumferential main grooves 21a, 21c. As illustrated in FIG. 3, five circumferential land portions 22a, 22b, 22c, 22d, 22e are also defined in this tread pattern, and the five circumferential land portions 22a, 22b, 22c, 22d, 22e include respective sipes 24, 25, 26, 27, 28 extending in zigzag fashion in the tire width direction. Furthermore, sipes 29, 30 extending in zigzag fashion in the tire circumferential direction are also provided in the circumferential land portions 22b, 22e adjacent to the tread edges TE. In the one half portion in the tire width direction, zigzag grooves formed by the grooves 31 and the sipes 32 being connected are provided in the circumferential land portion 22d, which is defined by the zigzag circumferential main groove 21b and the circumferential main groove 21a adjacent to the tread edge TE.

In the present disclosure, an inner liner may be included on the tire inner surface. Rubber mainly composed of butyl rubber, or a film layer having resin as the principal component, can be used as the material of the inner liner.

In the present disclosure, a porous member such as sponge may be provided on the tire inner surface, or electrostatic flocking processing may be performed, to reduce the cavity resonance noise.

In the present disclosure, a sealant member for preventing air leakage upon a blowout may be provided on the tire inner surface.

Figure 4A:
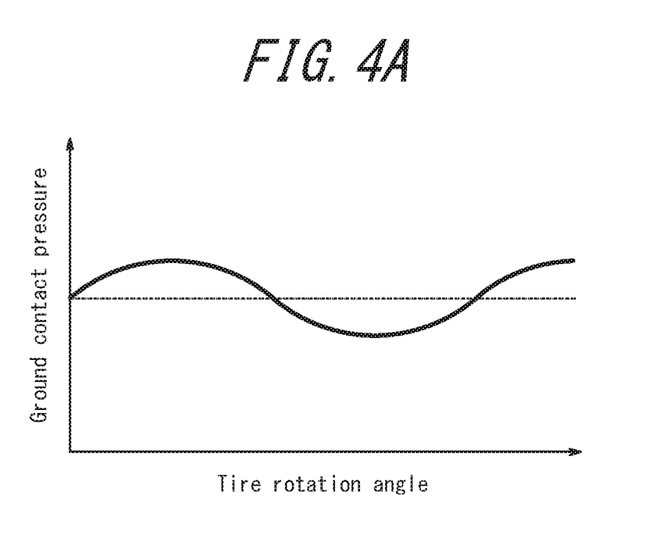
FIGS. 4A and 4B schematically illustrate the relationship between the rotation angle of a tire and the ground contact pressure.
Figure 4B:
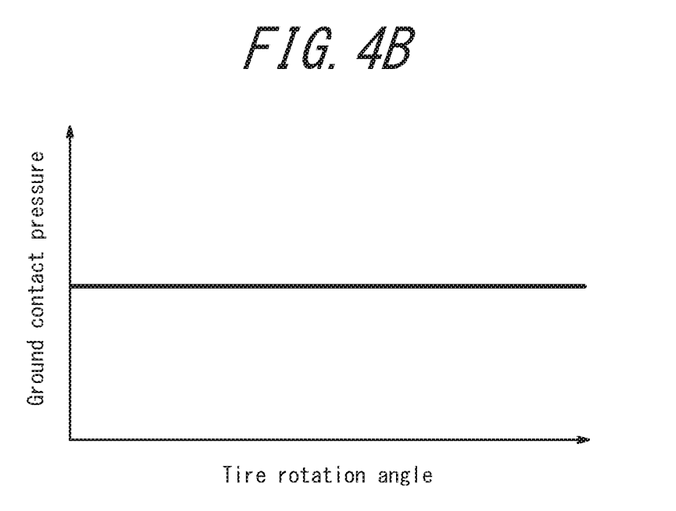

The circumstances by which the relational expression of the present disclosure was derived are now explained. FIGS. 4A and 4B schematically illustrate the relationship between the rotation angle of a tire and the ground contact pressure. I discovered that in a tire with a structure such that a band strip is spirally wound around the tire with gaps in the tire width direction between each lap of the band strip, the ground contact pressure becomes unstable along the tire circumference in some cases, as illustrated schematically in FIG. 4A, and becomes stable in other cases, as illustrated schematically in FIG. 4B.

I discovered that the ground contact behavior may become unstable in particular when the width d (mm) of the tire widthwise gap in the band strip of the circumferential belt 5 is large. This discovery is now described in further detail with reference to FIGS. 5 to 7.

Figure 5:
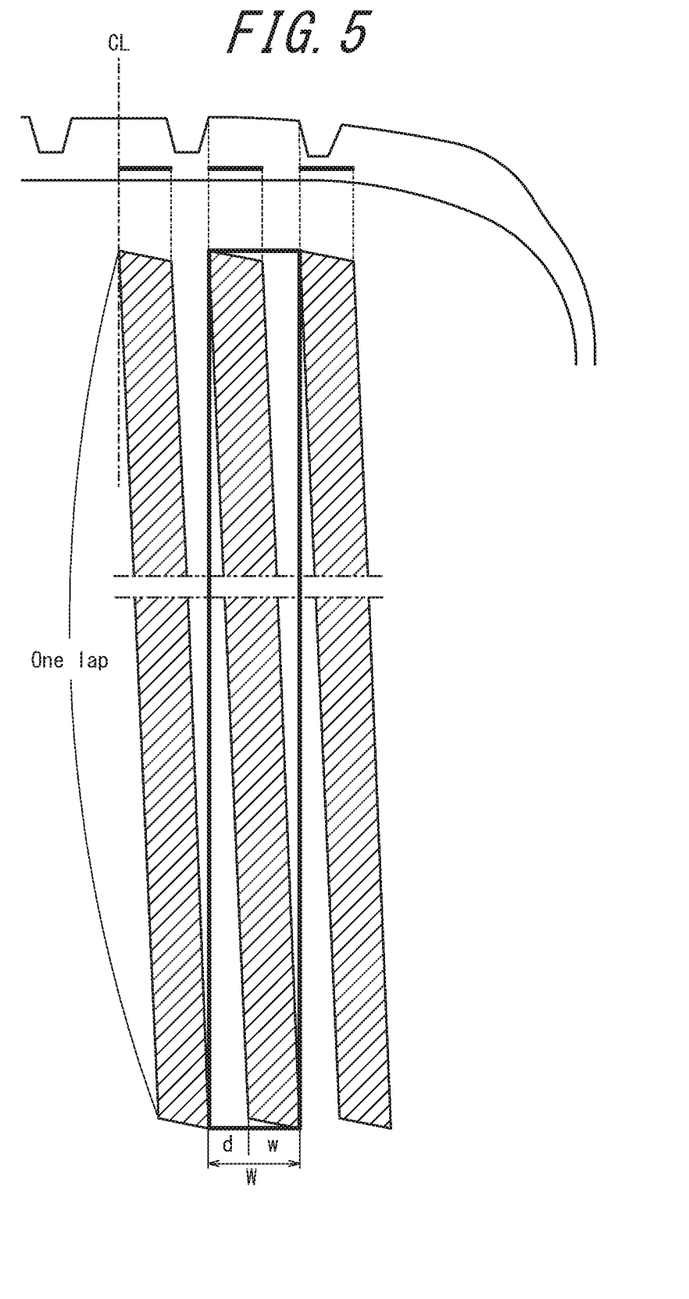
FIG. 5 schematically illustrates the positional relationship between a circumferential land portion and a band strip when W=w+d.
Figure 6:
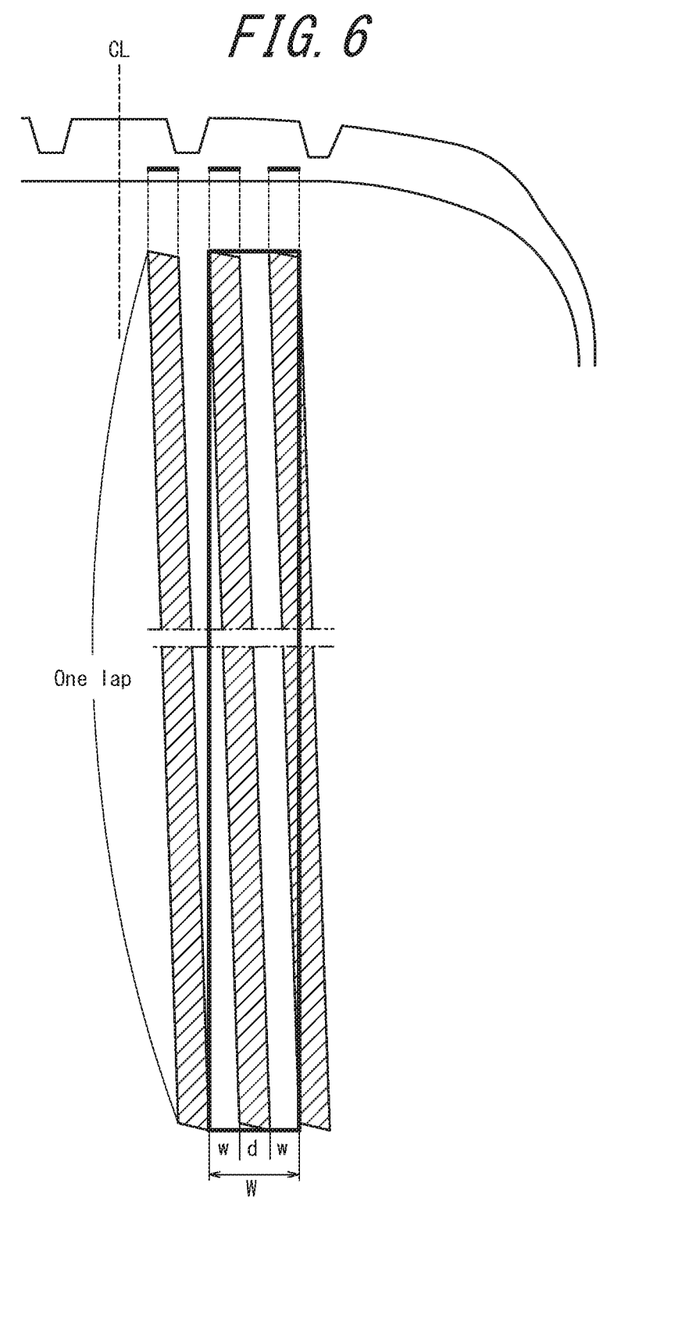
FIG. 6 schematically illustrates the positional relationship between a circumferential land portion and a band strip when W=w+2d.
Figure 7:
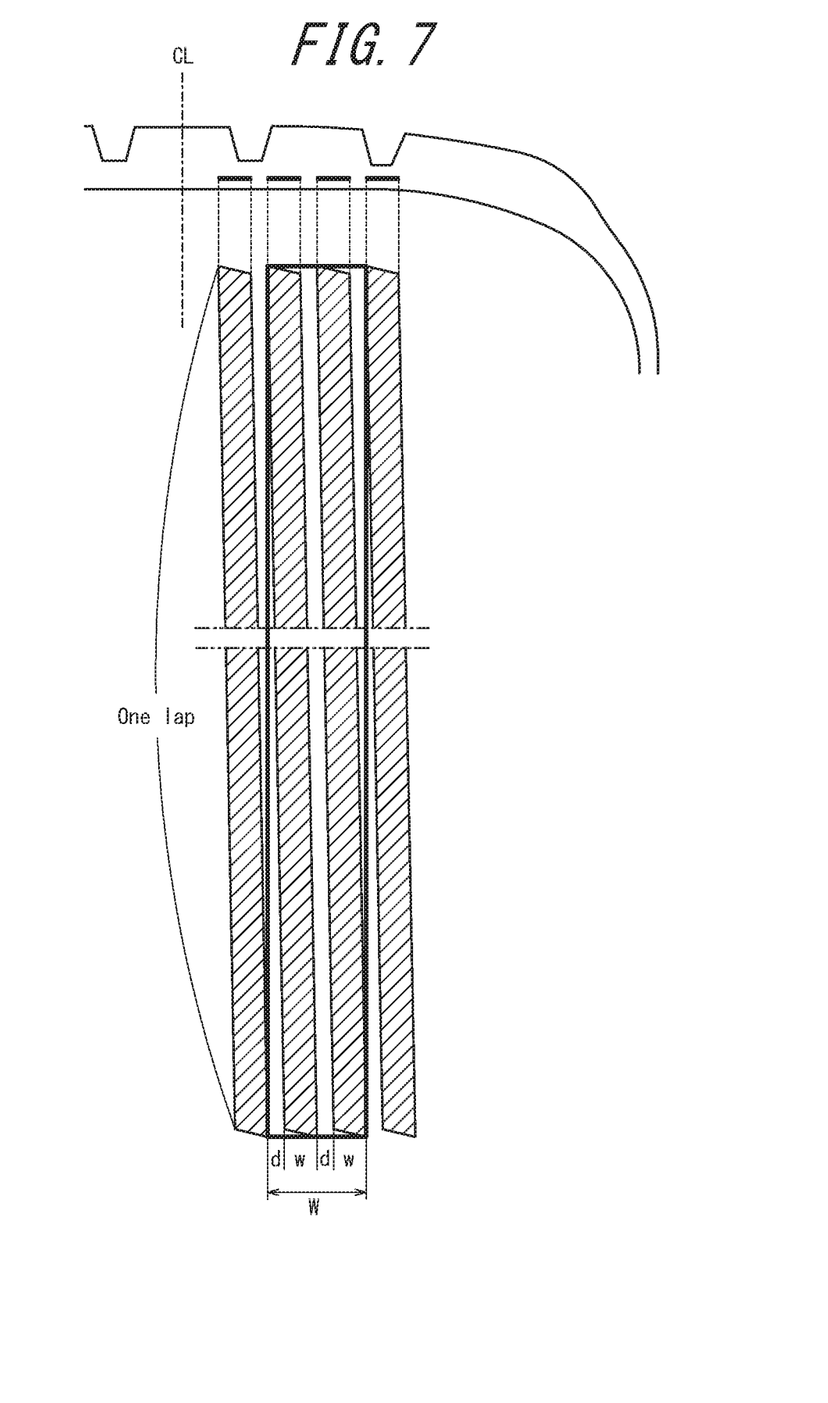
FIG. 7 schematically illustrates the positional relationship between a circumferential land portion and a band strip when W=2w+2d.

Here, W is the width in the tire width direction of the circumferential land portion with the smallest width among the three circumferential land portions. FIG. 5 schematically illustrates the positional relationship between the circumferential land portion and the band strip when W=w+d. FIG. 6 schematically illustrates the positional relationship between the circumferential land portion and the band strip when W=w+2d. FIG. 7 schematically illustrates the positional relationship between the circumferential land portion and the band strip when W=2w+2d.

In the cases illustrated in FIGS. 5 and 6, the ground contact pressure is unstable over the tire circumference, as illustrated in FIG. 4A. Conversely, in the case illustrated in FIG. 7, the ground contact pressure is stable over the tire circumference, as illustrated in FIG. 4B. Upon examining the cause, I discovered that the cases illustrated in FIGS. 5 and 6 and the case illustrated in FIG. 7 differ as follows. Specifically, in the case illustrated in FIG. 5, only one lap of the band strip is arranged in the tire width direction, over the tire circumference, for the circumferential land portion with the smallest width in the tire width direction. In the case illustrated in FIG. 6, a portion in which only one lap of the band strip is arranged in the tire width direction and a portion in which two laps of the band strip are arranged in the tire width direction exist in the tire circumferential direction for the circumferential land portion with the smallest width in the tire width direction. By contrast, in the case illustrated in FIG. 7, two laps of the band strip are continuously arranged in the tire width direction, over the tire circumference, for the circumferential land portion with the smallest width in the tire width direction. In other words, in the case illustrated in FIG. 5, the circumferential land portion with the smallest width in the tire width direction is continuously supported by only one lap of the band strip over the circumference. In the case illustrated in FIG. 6, the circumferential land portion with the smallest width in the tire width direction is supported by only one lap of the band strip at some point on the circumference. It is thought that in these cases, the base of the circumferential land portion becomes structurally unstable, leading to ground contact pressure vibration over the circumference (unevenness in the ground contact pressure over the circumference). Conversely, in the case with no ground contact pressure vibration illustrated in FIG. 7, the circumferential land portion with the smallest width in the tire width direction is supported by multiple laps of the band strip. It is thought that, consequently, the circumferential land portion is structurally stable over the circumference, yielding an even ground contact pressure at all points along the circumference.

Figure 8:
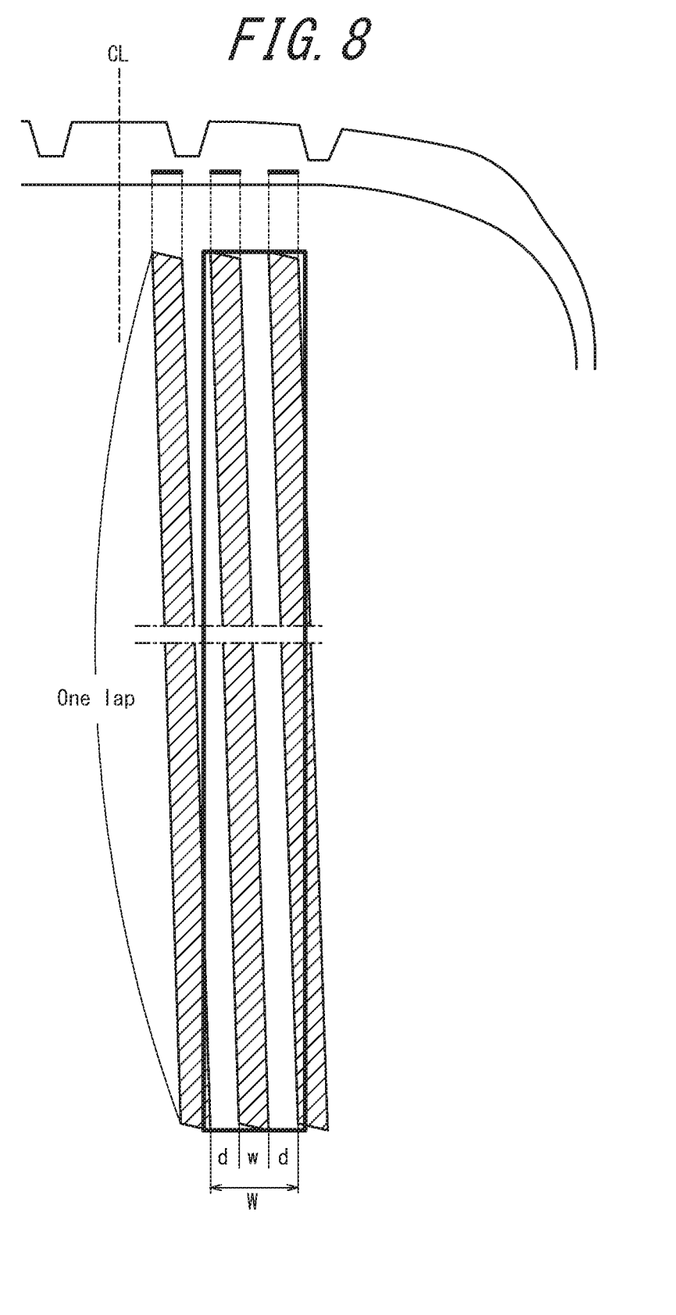
FIG. 8 schematically illustrates the positional relationship between a circumferential land portion and a band strip when $W/\{(w+2d)+0.3\times w\}=1.0$.
Figure 9:
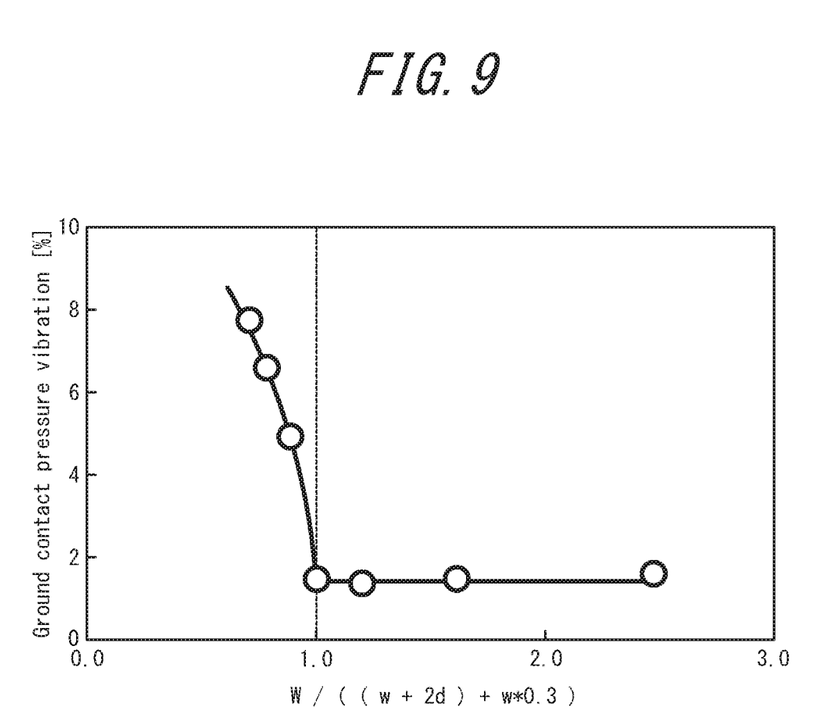
FIG. 9 illustrates the relationship between $W/\{(w+2d)+0.3\times w\}$ and ground contact pressure vibration.

FIG. 8 schematically illustrates the positional relationship between a circumferential land portion and the band strip when $W/\{(w+2d)+0.3\times w\}=1.0$. FIG. 9 illustrates the relationship between $W/\{(w+2d)+0.3\times w\}$ and ground contact pressure vibration. On the basis of the aforementioned discovery, I examined the condition for ground contact pressure vibration not to be generated. I discovered that when the following relational expression, $$W/\{(w+2d)+0.3\times w\} \geq 1.0,$$

is satisfied, the ground contact pressure vibration is a sufficiently small value of less than 2%, whereas when the relational expression is not satisfied, the ground contact pressure vibration rapidly increases, as illustrated in FIG. 9.

As described above, the circumferential belt in the tire of the present embodiment is a spirally wound band strip, and the following relational expression is satisfied, where W is the width in the tire width direction of the circumferential land portion, among one or more circumferential land portions, that has the smallest width in the tire width direction, w is the width of the band strip in the tire width direction, and d is the width of the gap in the tire width direction between each lap of the band strip.

$$W/\{(w+2d)+0.3\times w\} \geq 1.0$$

In the present disclosure, the relational expression $W/\{(w+2d)+0.3\times w\} \leq 2.0$ is preferably satisfied. Setting $W/\{(w+2d)+0.3\times w\}$ to be 2.0 or less ensures a certain width of the gap and can obtain the effects of reducing the vertical spring constant and reducing weight.

The ratio w/d preferably satisfies the relational expression $1.5 \leq w/d \leq 3.0$.

Tension due to internal pressure is the leading cause of ground contact pressure vibration in the circumferential belt. Accordingly, the above relational expressions can be applied regardless of tire size, tread shape, belt rigidity, and the like.

First, by virtue of including the circumferential belt 5 on the tire radial outside of the inclined belt 4, the tire of the present embodiment can achieve a hoop effect, suppress radial growth due to the centrifugal force during high-speed rotation, and increase high-speed durability and the like. Since the cords of the inclined belt layer are steel cords, and the total cross-sectional area of the steel cords per 25 mm of width perpendicular to the extending direction of the steel cords is in a range of 2.3 mm$^2$ to 4.0 mm$^2$, the reinforcing effect yielded by the inclined belt layer can be sufficiently ensured while reducing the vertical spring constant, without an excessive increase in weight due to the steel cords. The band strip is arranged with gaps in the tire width direction, thereby achieving the reinforcing effect of the circumferential belt without an excessive increase in weight due to the band strip. Furthermore, restricting the width W, width w, and interval d of the circumferential land portion and band strip to satisfy the aforementioned relational expression can reduce the ground contact pressure vibration over the circumference of the tire and improve the steering stability and braking performance while reducing the vertical spring constant. The reduction in ground contact pressure vibration can also improve the cornering grip performance, reduce the vehicle vibration, and improve the uneven wear resistance.

Figure 10:
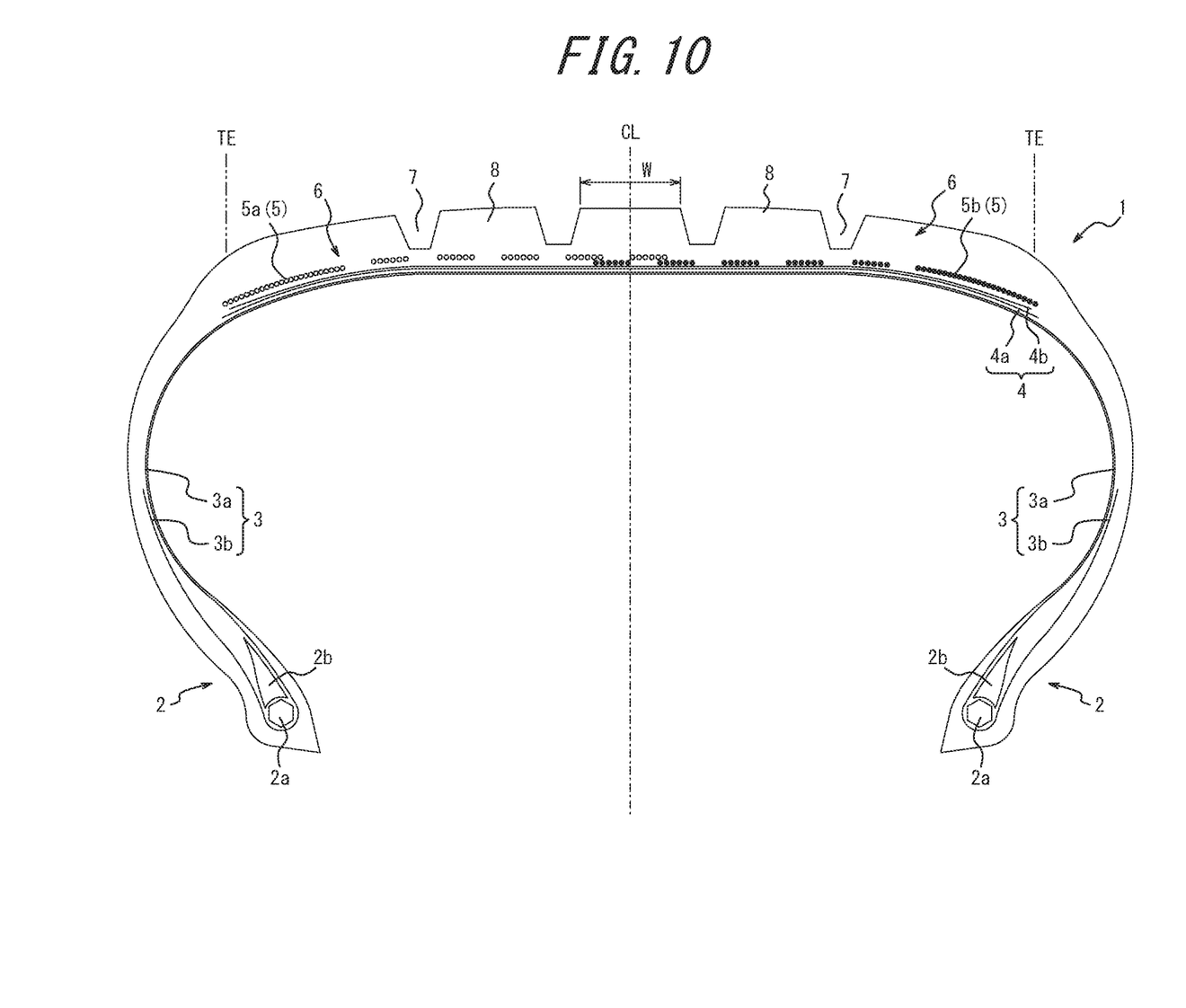
FIG. 10 is a cross-section in the tire width direction of a pneumatic tire according to still another embodiment of the present disclosure.

FIG. 10 is a cross-section in the tire width direction of a pneumatic tire according to still another embodiment of the present disclosure. The tire in FIG. 10 differs from the tire of the embodiment in FIG. 1 by including two band strips spirally wound independently from each other. As illustrated in FIG. 10, one of the band strips (the circumferential belt 5a) is located in a half portion on one side of the tire equatorial plane CL in the tire width direction, and the other band strip (the circumferential belt 5b) is located in the half portion on the other side of the tire equatorial plane CL in the tire width direction. In the example illustrated in FIG. 10, the band strips each have a one-lap wound portion extending beyond the tire equatorial plane CL. One end of each one-lap wound portion (the end at the other side from the extending direction end) is in contact with the tire equatorial plane CL. One band strip (the circumferential belt 5a) is on the tire radial outside of the other band strip (circumferential belt 5b). In this example, the circumferential belts 5a, 5b have a portion, on the tire width direction outside, where the band strip is wound without a gap between laps.

In the present disclosure, the band strip is thus preferably formed by at least four and no more than seven organic fiber cords, and two of the band strips spirally wound independently from each other are preferably included. One band strip is located in a half portion on one side of the tire equatorial plane CL in the tire width direction, and the other band strip is located in the half portion on the other side of the tire equatorial plane CL in the tire width direction. Use of at least four cords improves productivity and can reduce costs. Use of at most seven cords can prevent the rigidity from increasing excessively. To increase uniformity, this structure is preferably formed so that each band strip is wound an integer number of times in the tire circumferential direction and so that the beginning of one band strip and the end of the other band strip are aligned in the tire circumferential direction. The positions of the beginning of one band strip and the end of the other band strip can also be varied in a range of 30° or less to either side in the tire circumferential direction as viewed in a tire circumferential cross-section.

The pneumatic tire of the present disclosure can be applied to tires for various purposes, such as passenger vehicle tires, commercial vehicle tires, and heavy duty vehicle tires.

Embodiments of the present disclosure have been described, but the present disclosure is in no way limited to the above embodiments, nor to the below-described Examples.

EXAMPLES

Example 1 and Comparative Examples 1-6 with a tire size of 165/55R15 were prepared, and the following tests were performed to confirm the effects of the tire of the present disclosure.

<Ground Contact Pressure Vibration>

Each of the aforementioned tires was attached to a rim with a rim size of 4.5 J and filled to an internal pressure of 240 kPa, and a load of 3790 N was applied. The ground contact pressure of the contact patch was then measured during rolling with an indoor tester. The tire was rotated once at very low speed on a glass road surface. The resulting data was subjected to image analysis and extracted at the required tire widthwise position in the contact patch, and the ground contact pressure waveform was extracted. In this way, the pressure on the tire circumference was measured for a quasi-static ground contact pressure state. The ground contact pressure was measured using a properly calibrated ground contact pressure measurement apparatus which operates principally by irradiating a glass surface, whose refractive index changes upon contact with the tire, from the side so as to emit light in proportion to the ground contact pressure. The ground contact pressure vibration is indicated as a ratio (%) of the amplitude of the primary waveform to the average ground contact pressure when performing a FFT on over 6000 data points for one rotation.

<Steering Stability>

As to Example and Comparative Example 5, a test driver performed a feeling test by driving an actual vehicle on a test course. The steering stability is indicated as an index, with the evaluation result for the tire of Comparative Example 1 as 100. A larger value indicates better steering stability.

As to other Comparative Examples, paper tests are performed.

<Braking Performance>

As to Example and Comparative Examples 5 and 6, a vehicle was actually driven on a test course with a wet road surface controlled to a water depth of 0.6 mm, the distance from the start of braking until the vehicle stopped was measured, and the inverse of the measured distance was taken. The braking performance is indicated as an index, with the evaluation result for the tire of Comparative Example 1 as 100. A larger value indicates better braking performance on wet surfaces.

As to other Comparative Examples, paper tests are performed.

<Vertical Spring Constant>

Each tire was attached to a rim with a rim size of 4.5 J and filled to an internal pressure of 240 kPa, and a load of 70% of the load corresponding to the maximum load capability was applied in the tire radial direction. The deflection in the tire radial direction was then measured. The vertical spring constant is indicated as an index, with the measurement result for the tire of Comparative Example 1 as 100. A smaller value indicates a smaller vertical spring constant.

<Tire Weight>

The weight of each tire was measured. The weight is indicated as an index, with the measurement result for the tire of Comparative Example 1 as 100. A smaller value indicates a smaller tire weight.

Table 1 lists the evaluation results.

TABLE 1

|  | Example 1 | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Rib width W (mm) | 20 | 20 | 20 | 20 | 20 | 20 | 20 |
| Belt steel cross-sectional area (mm$^2$) | 4.0 | 4.6 | 4.6 | 4.6 | 4.0 | 4.0 | 4.0 |
| Band strip width w (mm) | 6.2 | 6.2 | 6.2 | 6.2 | 6.2 | 6.2 | 6.2 |
| Number of cords in band strip | 6 | 6 | 6 | 6 | 6 | 6 | 6 |
| Gap d of band strip (mm) | 5.7 | 0.0 | 5.7 | 10.0 | 0.0 | 10.0 | 6.5 |
| W/{w + 2 d) + 0.3 w} | 1.02 | 2.47 | 1.02 | 0.71 | 1.02 | 0.71 | 0.95 |
| Ground contact pressure vibration (%) (primary waveform amplitude/average ground contact pressure) | 1.8 | 1.6 | 1.7 | 1.9 | 1.5 | 4.5 | 3.4 |
| Steering stability (INDEX) | 100 | 100 | 100 | 100 | 100 | 70 | 80 |
| Wet braking performance (INDEX) | 100 | 100 | 100 | 100 | 100 | 95 | 96 |
| Vertical spring constant (INDEX) | 92 | 100 | 98 | 97 | 94 | 91 | 92 |
| Tire weight (INDEX) | 95 | 100 | 99 | 99 | 96 | 94 | 95 |

Compared to the tires of Comparative Examples 1 to 6, the tire of Example 1 can improve steering stability and braking performance while reducing the vertical spring constant, as illustrated in Table 1.

REFERENCE SIGNS LIST

1 Pneumatic tire
2 Bead portion
3 Carcass
4 Inclined belt
5, 5a, 5b Circumferential belt
6 Tread portion
7 Circumferential main groove
8 Circumferential land portion
11 Circumferential main groove
12a, 12b Circumferential land portion
13 Groove
14 Groove
15 Sipe
16 Groove
17 Groove
18 Groove
19 Sipe
21, 21a, 21b, 21c Circumferential main groove
22a, 22b, 22c, 22d, 22e Circumferential land portion
23 Groove
24, 25, 26, 27, 28 Sipe
29, 30 Sipe
31 Groove 32 Sipe
CL Tire equatorial plane
TE Tread edge

The invention claimed is:

1. A pneumatic tire comprising:
a carcass formed by one or more carcass plies extending toroidally between a pair of bead portions;
an inclined belt arranged on a tire radial outside of the carcass and formed by one or more inclined belt layers made of cords extending at an inclination relative to a tire circumferential direction;
a circumferential belt arranged on the tire radial outside of the inclined belt and formed by one circumferential belt layer made of cords extending in the tire circumferential direction; and
a tread portion on the tire radial outside of the circumferential belt; wherein
the one circumferential belt is made of only one spirally wound band strip;
the tire further comprises, on the tread portion, a plurality of circumferential main grooves extending in the tire circumferential direction and three or more circumferential land portions defined by two circumferential main grooves or by one circumferential main groove and a tread edge;
the cords of the inclined belt layer are steel cords, and a total cross-sectional area of the steel cords per 25 mm of width perpendicular to an extending direction of the steel cords is in a range of 2.3 mm² to 4.0 mm²;
in a reference state in which the tire is mounted on an applicable rim, filled to a prescribed internal pressure, and has no load applied thereon,
a gap is present in a tire width direction between each lap of the band strip;
a relational expression $W/\{(w+2d)+0.3 \times w\} \geq 1.0$ is satisfied; and
a relational expression $W = 2w + 2d$ is satisfied;
where W is a width in the tire width direction of a circumferential land portion, among the three or more circumferential land portions, that has a smallest width in the tire width direction, w is a width of the band strip in the tire width direction, and d is a width of the gap in the tire width direction between each lap of the band strip; the circumferential land portion having the smallest width in the tire width direction is located on the tire equator in the tire width direction;
a width of the circumferential belt in the tire width direction is set from 90% to 110% of a width of the inclined belt in the tire width direction;
one end of the circumferential belt at a first side of the tire in the tire width direction is positioned more outwardly than one end of the inclined belt at the first side of the tire in the tire width direction; and
another end of the circumferential belt at a second side of the tire in the tire width direction is positioned more inwardly than another end of the inclined belt at the second side of the tire in the tire width direction.

* * * * *